3,305,431
FLAMEPROOFING COMPOSITION, METHOD AND ARTICLE CONTAINING SAME
George J. Peterson, Park Forest, Ill., assignor to Swift & Company, Chicago, Ill., a corporation of Illinois
No Drawing. Continuation of application Ser. No. 8,516, Feb. 15, 1960. This application July 17, 1963, Ser. No. 295,835
5 Claims. (Cl. 161—232)

This invention relates to the treatment of cellulosic materials and more particularly to a method whereby combustible cellulosic materials can be rendered fire and flameproof and also provided with a coating of adhesive material. More particularly, the invention relates to a composition and means for employing said composition in the treatment of cellulosic materials whereby the cellulosic materials can be flameproofed and bonded either to themselves or to other substrates.

This application is a continuation of application Serial No. 8,516, filed February 15, 1960, and now abandoned.

The principal object of the invention is to provide a composition and means whereby cellulosic materials can be coated with a flameproofing adhesive composition so as to permit bonding of the coated cellulosic material to other cellulosic materials or noncellulosic substrates while imparting to the coated cellulosic material combustion inhibiting or retarding properties.

Another object is the provision of a flameproofing adhesive composition and laminated webs of cellulosic material which possess an improved resistance to combustion.

Additional objects, if not specifically set forth herein, will be readily apparent to those skilled in the art from the detailed description of the invention which follows.

The compositions of this invention comprise dispersions of a film-forming adhesive, a halogenated aliphatic compound, and a salt of a metal such as arsenic, antimony, bismuth or tin. The invention contemplates applying this flameproof adhesive mixture to the surface of paper, fabric, wood or other essentially cellulosic fibrous material, spreading said flameproof adhesive over the surface in a continuous film and causing said cellulosic material to be bonded either to other cellulosic materials or to noncellulosic substrates. The invention has particular application in the treatment of paper, specifically heavyweight paper such as is employed in the building trades, although other paper stock, jute, wood-pulp, cotton, etc., may be bonded to other material. Veneer board comprising several thin layers of wood cemented together may vary advantageously be manufactured with the subject compositions. The material treated need only be one which can be bonded with the adhesive element of the composition, yet should be sufficiently porous so that the halogenated, aliphatic, organic material can impregnate the fibrous material and migrate away from the adhesive bond inasmuch as the halogenated material is incompatible with the adhesive component, particularly after the adhesive bond is formed and dry.

More particularly, the invention includes a method for coating and impregnating fibrous absorbent cellulosic materials, particularly in web form, with a smooth mixture containing a major amount of an adhesive base and lesser amounts of halogenated, aliphatic, organic compositions and water-insoluble salts of antimony, arsenic, bismuth and tin. The composition is applied on the surface of the fibrous material, such as paper or wood, in the form of a continuous film, and the coated cellulosic base is then bonded either to another cellulosic material or to a non-cellulosic substrate. Laminated materials represent a favored area of use of these compositions, particularly laminated webs or sheets such as are employed in the preparation of insulation materials in the building trades and also where sheets of wood are bonded together to form a veneer.

The flameproofing adhesive composition comprises about 10–80% of an adhesive known in the art as a suitable cellulose adhesive, about 10–80% of a halogenated fatty acid derivative such as a halogenated fatty acid ester, halogenated fatty alcohol, amide, ether, etc., and about 10–80% of a salt of one or more of the metals, antimony, arsenic, bismuth or tin. The flameproof adhesive mixture is prepared preferably by dispersing the metal salt in a halogenated higher fatty acid derivative and the suspension is agitated vigorously to produce a homogeneous slurry. The smoothness of the suspension or dispersion is increased with increased agitation. If the adhesive is in liquid form at room temperature, it is then added to the slurry with agitation. If the adhesive is not liquid at room temperature, it is heated prior to mixing with the slurry to liquefy the adhesive. Although the adhesive must be incompatible with the halogenated composition in order to insure migration of the halogenated material into the cellulosic base, thorough mixing insures that these components will not separate and a smooth, stable dispersion is formed.

The adhesive component of the mixture, as mentioned previously, comprises the major portion thereof and can be any known adhesive adapted for use with cellulosic materials such as the animal and vegetable-derived adhesives, glue, rosin, starch, soybean flour, casein adhesives, etc.; also, synthetic adhesive compositions such as emulsions and dispersions of polyvinyl alcohol, polyvinyl acetate, latex, and compounded adhesives are suitable. The adhesive should be insoluble in or immiscible with the halogen-supplying element, and this incompatibility must also extend to the composition in the dry form.

The halogenated material can be a mono-, di-, or poly-hydric aliphatic alcohol ester of a halogenated fatty acid of 10–30 carbons, such as brominated soybean oil, brominated sesame oil, brominated safflower oil, and brominated rape seed, linseed, menhaden, cottonseed oils, lard, tallow, or the fish oils. Generally, halogenated animal, vegetable, and marine triglyceride having more than about 20% halogen can desirably be employed inasmuch as these compositions are, for the most part, low viscosity fluid materials which are readily available. The halogenated component of the mixture can also be a mixture of halogenated materials, such as a mixture of brominated soybean oil and brominated cottonseed oil or other brominated glyceride oils. Also, the halogen-substituted higher fatty acid esters of aliphatic glycols and aliphatic tetritols, pentitols, and hexitols may be used. While derivatives of chlorinated fatty acids may be employed, it has been found preferable to employ the brominated derivatives inasmuch as it appears that less of the brominated derivative is required to obtain a given amount of flameproofing. Usually the flameproofing composition contains at least about 15% of the halogenated fatty acid derivative. However, in some cases, the flameproofing composition may contain only 10% halogenated fatty acid derivatives if other halogenated compositions are present.

The metal salt which is part of the composition and which may include oxides and sulfides of arsenic, antimony, bismuth, and tin, should be present in an amount of at least 10% based on the weight of the adhesive mix. The salt should be water-insoluble and includes such salts as antimony potassium tartrate, antimony oxide, antimony trisulfide, bismuth trisulfide, and the sulfides of tin and arsenic. Also, the double salts of these metals such as lead antimonates and the arsenates may be employed. In preparing the adhesive mix the metal salt is dispersed in the halogenated material, and the dispersion is vigorously agitated with the adhesive to obtain a smooth, homogeneous mixture.

The material treated may be any fibrous, absorbent, cellulosic material which will absorb the halogenated composition. Cellulosic materials such as paper, wood, structural board (wallboard), cotton fabric, etc., may advantageously be adhered to webs of the same type of material or to other non-cellulosic substrates such as metal, plastics, and noncellulosic fibers. The flameproof adhesive material is particularly useful in the lamination of paper, specifically heavyweight paper, to webs of the same material or to metal foil or to wood. Paper, such as unbleached kraft paper (37 lbs. per ream), is employed in the preparation of insulating sheet, and it is often necessary to bond sheets of this heavyweight paper to metal foil, specifically aluminum foil. The flameproof adhesive in this case is deposited on the surface of the foil or the paper in a thin, substantially continuous layer, and the webs of paper and foil are pressed together. Also, laminates of wood are formed in the same fashion to provide flameproofed veneer. It can be appreciated that larger amounts of the flameproofing adhesive will impart greater combustion resistance to the material being treated although it can be stated generally that if the flameproof adhesive contains at least 15% of the halogenated fatty material and the fatty material contains about 33% or more halogen, a laminate having very desirable fire-retardant properties will be provided.

The amount of flameproof adhesive to be employed in providing satisfactory combustion resistance is expressed as the amount of halogenated fatty material based on the weight of cellulosic material being treated. Usually about 13–50% brominated glyceride such as brominated cottonseed oil or brominated soybean oil based on the weight of paper or other porous cellulosic material provides good flameproofing. Larger amounts of the halogenated composition are required if chlorinated rather than brominated glycerides are used. In a preferred embodiment, 13–35% of the brominated oil based on the weight of cellulosic material is employed. While larger amounts impart good flame resistance to the paper or like material, the use of larger amounts is not recommended since the degree of increased flameproofness is not commensurate with the added cost.

A preferred flameproof adhesive containing:

| | Percent by weight |
|---|---|
| Brominated soybean oil (30% bromine) | 20 |
| Everflex-B polyvinyl acetate emulsion [1] (55% solids) | 65 |
| Antimony oxide | 15 |

See footnote [1] below.

when spread on 30 lb. kraft paper and the paper laminated to aluminum foil provided good flameproofing properties. The flameproof adhesive was employed at a level which provided about 13% brominated oil based on the weight of the paper.

The examples which follow are designed to illustrate the mode of operation of the invention. The examples are in no way to be considered limitative on the spirit and scope of the invention inasmuch as the invention is defined in the appended claims.

---

[1] Vinyl acetate-maleic anhydride copolymer-Everflex-B described in Bulletin E-13, March 1955, of the Dewey and Almy Chemical Co., Cambridge, Mass.

Example I

The following ingredients were admixed to form a smooth dispersion:

| | Parts by weight |
|---|---|
| Brominated soybean oil (35% bromine) | 22.5 |
| Everflex-B polyvinyl acetate emulsion [1] (55% solids) | 66.5 |
| Antimony oxide | 11.0 |

This formula was applied on the surface of .00035″ aluminum foil and the foil was immediately bonded to a web of 30 lb. unbleached sulfite kraft paper. After smoothing the paper, the lamination was placed in the oven and dried for 2 minutes at about 200° F.

Twenty-four hours later, the lamination was tested for flameproofness according to ASTM Method D777–46. The laminated paperfoil showed excellent flameproofing properties. The laminate contained about 13% by weight of the brominated oil based on the weight of the paper.

Example II

The following formula was prepared substantially in accordance with the method set forth in Example I above:

| | Parts by weight |
|---|---|
| Water | 42.5 |
| Dextrin | 18.0 |
| Borax | 2.0 |
| Sodium metasilicate | 2.5 |
| Antimony oxide | 15.0 |
| Brominated soybean oil (35% bromine) | 20.0 |

When this material was deposited on the surface of 30 lb. kraft paper, this paper laminated with another untreated web of 30 lb. kraft paper, and the laminated material dried, the laminate showed excellent resistance to the development of combustion when subjected to the standard ASTM flameproofing test.

Example III

A hot melt adhesive was prepared by dispersing antimony oxide in brominated soybean oil and this dispersion was admixed with melted microcrystalline wax and W. wood rosin and also ethyl cellulose. The formula of the hot melt, flameproof adhesive is as follows:

| | Parts by weight |
|---|---|
| W. wood rosin | 46 |
| Microcrystalline wax (M.P. 190–195° F.) | 10 |
| Ethyl cellulose | 9 |
| Antimony oxide | 15 |
| Brominated soybean oil (35% bromine) | 20 |

This composition was applied to the surface of a web of 30 lb. kraft paper, a thin film of the adhesive was formed, and glass fiber scrim was placed on the adhesive surface, followed by a web of aluminum foil. The laminate was pressed and then subjected to drying at about 200° F. in the oven. This laminate exhibited very satisfactory flameproofness.

Example IV

The following composition:

| | Parts by weight |
|---|---|
| Casein solution | 38.75 |
| Modified rosin emulsion (65% solids) | 15.0 |
| Neoprene latex (50% solids) | 33.0 |
| Antioxidant | 0.75 |
| Zinc oxide | 0.5 |
| Antimony oxide | 11.0 |
| Brominated soybean oil (35% bromine) | 11.0 | was tested for flameproofing properties in a laminate of 30 lb. kraft paper bonded to another sheet of 30 lb. kraft. The laminate showed good flameproofing properties.

Attempts to obtain the results of the invention by use of each of the components individually have not been successful. If the halogenated fatty acid ester is first deposited on the cellulosic material, the adhesive does not form a bond between the materials being bonded because of the oily nature of the surface on which the oil is deposited. Reversal of these steps also is not feasible since the brominated material cannot be spread continuously over either the wet or dried adhesive.

Obviously, many modifications and variations of the invention as hereinbefore set forth may be made without departing from the spirit and scope thereof and, therefore, only such limitations should be applied as are indicated in the claims which follow.

I claim:

1. A flameproof adhesive composition comprising: a mixture of at least about 10% based upon the weight of said mixture of a water-insoluble salt of a metal selected from the group consisting of arsenic, antimony, bismuth and tin, at least about 15%, by weight, of a brominated vegetable oil having at least 20% bromine, and at least about 10%, by weight, of a polyvinyl acetate adhesive.

2. A method for treating a web of fibrous material to coat said material with an adhesive and render said material resistant to combustion, comprising: depositing on said web a composition comprising a homogeneous mixture of at least about 10%, by weight, of a brominated fatty material containing at least 20% bromine, a major amount of an adhesive which is immiscible with said brominated material, and at least about 10%, by weight, of a water-insoluble salt of a metal selected from the group consisting of antimony, arsenic, bismuth and tin, and distributing said composition over the surface of said web whereby to form a thin film of said adhesive bonded to said web, and to cause said brominated fatty material to migrate into said web.

3. A method for treating webs of fibrous cellulosic materials, coating said materials with an adhesive and rendering said materials resistant to combustion, comprising: depositing on said webs a composition comprising a homogeneous mixture of about 10–80%, by weight, of a cellulose adhesive immiscible with halogenated higher fatty acid esters, about 10–80%, by weight, of a halogenated higher fatty acid ester, and about 10–80%, by weight, of a water-insoluble salt of a metal selected from the group consisting arsenic, antimony, bismuth and tin, whereby to form a thin film of said adhesive bonded to said web, and to cause said halogenated fatty acid esters to migrate into said web.

4. A flameproof paper laminate comprising: a web of paper attached to a backing material with an adhesive, said paper being impregnated with a homogeneous mixture of about 10–80%, by weight, of a cellulose adhesive immiscible with halogenated higher fatty acid esters, about 10–80%, by weight, of halogenated higher fatty acid ester, and about 10–80%, by weight, of a water-insoluble salt of a metal selected from the group consisting of arsenic, antimony, bismuth and tin, whereby to cause said halogenated fatty acid esters to migrate into said paper, and to form an adhesive bond with said backing material.

5. The laminate of claim 4 wherein the halogenated higher fatty acid ester is a brominated glyceride.

References Cited by the Examiner

UNITED STATES PATENTS

| | | | |
|---|---|---|---|
| 962,877 | 6/1910 | Aylsworth | 106—15 XR |
| 2,299,612 | 10/1942 | Clayton et al. | 106—18 |
| 2,420,644 | 5/1947 | Athy et al. | 106—15 XR |
| 2,436,216 | 2/1948 | Leatherman | 106—18 |
| 2,881,097 | 4/1959 | Giordano et al. | 106—15 XR |
| 2,924,532 | 2/1960 | Dereich | 106—15 XR |

ALEXANDER H. BRODMERKEL, *Primary Examiner.*

MORRIS LIEBMAN, *Examiner.*

J. B. EVANS, *Assistant Examiner.*

UNITED STATES PATENT OFFICE
CERTIFICATE OF CORRECTION

Patent No. 3,305,431                             February 21, 1967

George J. Peterson

It is hereby certified that error appears in the above numbered patent requiring correction and that the said Letters Patent should read as corrected below.

Column 1, line 51, for "vary" read -- very --; column 2, line 32, for "previousely" read -- previously --; column 3, line 27, for "alumium" read -- aluminum --; column 5, line 20, after "acetate" insert -- emulsion --.

Signed and sealed this 25th day of June 1968.

(SEAL)
Attest:

Edward M. Fletcher, Jr.
Attesting Officer

EDWARD J. BRENNER
Commissioner of Patents